United States Patent
Murakami

(10) Patent No.: US 7,159,689 B2
(45) Date of Patent: Jan. 9, 2007

(54) ELECTRIC POWER STEERING APPARATUS

(75) Inventor: Tetsuya Murakami, Nara (JP)

(73) Assignee: Koyo Seiko Co. Ltd., Osaka (JP)

( * ) Notice: Subject to any disclaimer, the term of this patent is extended or adjusted under 35 U.S.C. 154(b) by 176 days.

(21) Appl. No.: 10/829,449

(22) Filed: Apr. 22, 2004

(65) Prior Publication Data

US 2004/0211620 A1    Oct. 28, 2004

(30) Foreign Application Priority Data

Apr. 25, 2003    (JP) ............................. 2003-122422

(51) Int. Cl.
B62D 5/04    (2006.01)
(52) U.S. Cl. ..................... 180/444; 180/443
(58) Field of Classification Search ................ 180/443, 180/444

See application file for complete search history.

(56) References Cited

U.S. PATENT DOCUMENTS

| | | | |
|---|---|---|---|
| 4,415,054 A | 11/1983 | Drutchas | |
| 4,572,314 A * | 2/1986 | Anguera | ...................... 180/444 |
| 4,577,715 A | 3/1986 | Saito | |
| 5,590,566 A | 1/1997 | Joerg et al. | |
| 6,749,040 B1 * | 6/2004 | Menjak et al. | ............... 180/443 |
| 6,810,985 B1 * | 11/2004 | Budaker et al. | ............. 180/444 |
| 2006/0060413 A1 * | 3/2006 | Namgung | .................... 180/444 |

FOREIGN PATENT DOCUMENTS

| | | |
|---|---|---|
| EP | 1 086 880 A2 | 3/2001 |
| JP | 10-194140 | 7/1998 |
| JP | 10-194149 | 7/1998 |

* cited by examiner

Primary Examiner—Lesley D. Morris
Assistant Examiner—Daniel Yeagley
(74) Attorney, Agent, or Firm—Rabin & Berdo, P.C.

(57) ABSTRACT

An electric power steering apparatus comprises: a pinion provided on a shaft co-rotatable with a steering member; a steering shaft including a rack meshed with the pinion, the steering shaft being movable in an axial direction thereof; a steering shaft guiding device; and a motion converting mechanism. The steering shaft guiding device guides the steering shaft for axial movement, and biases the steering shaft toward the pinion. The motion converting mechanism includes a rotary cylinder surrounding the steering shaft and driven by a steering assist electric motor, and converts rotation of the rotary cylinder into the axial movement of the steering shaft. The steering shaft is supported by the rotary cylinder, the pinion and a guide. The pinion is located between the rotary cylinder and the guide axially of the steering shaft.

5 Claims, 6 Drawing Sheets

ELECTRIC POWER STEERING APPARATUS

BACKGROUND OF THE INVENTION

1. Field of the Invention

The present invention relates to an electric power steering apparatus which generates a steering assist force by an electric motor.

2. Description of Related Arts

There is known an electric power steering apparatus of a so-called rack assist type, which is adapted to convert the output rotation of a steering assist electric motor into the axial movement of a steering shaft including a rack through a motion converting mechanism such as a ball screw mechanism.

In the electric power steering apparatus, a noise (rattle) is liable to occur due to backlash of the components of the ball screw mechanism.

In general, the backlash should be minimized within a range allowed by the accuracy of the machining of the components in order to minimize the noise. More specifically, a so-called matching assembly process is performed, in which components for the ball screw mechanism are classified according to deviation in dimensional accuracy, and components providing an acceptable combinational dimensional accuracy are assembled into the ball screw mechanism. However, the matching assembly process requires much labor, resulting in higher production costs.

An electric power steering apparatus having a support arrangement shown in FIGS. 5A, 5B and 5C is disclosed, for example, in Japanese Unexamined Patent Publication No. 10-194140 (1998).

Referring to FIG. 5A, a ball nut 91 of a ball screw mechanism is engaged with a first end portion 92a of a steering shaft 92 in the electric power steering apparatus. A pinion 93 coupled to a steering wheel (not shown) is meshed with a second end portion 92b of the steering shaft 92. A rack guide 94 including a biasing member for biasing the steering shaft 92 toward the pinion 93 is disposed between the ball nut 91 and the pinion 93. Referring to FIG. 5B, the steering shaft 92 is supported at three points by the ball nut 91, the pinion 93 and the rack guide 94.

On the other hand, an electric power steering apparatus having a support arrangement shown in FIGS. 6A, 6B and 6C is disclosed, for example, in Japanese Unexamined Patent Publication No. 10-194149 (1998).

Referring to FIG. 6A, the electric power steering apparatus has substantially the same construction as the electric power steering apparatus shown in FIG. 5A, except that a stopper 95 for limiting the warp of the second end portion 92b of the steering shaft 92 is additionally provided. Referring to FIG. 6B, the steering shaft 92 is supported at three points, under normal conditions, by the ball nut 91, the pinion 93 and the rack guide 94 in the same manner as in the electric power steering apparatus shown in FIG. 5B. When the second end portion 92b of the steering shaft 92 is warped opposite from the pinion 93 beyond a predetermined warpage, the second end portion 92b is supported by the stopper 95.

In the former and latter electric power steering apparatuses, the steering shaft 92 is disposed transversely of a motor vehicle. The pinion 93 is disposed forwardly (in a direction F) of the steering shaft 92 with respect to the vehicle, and the rack guide 94 is disposed rearwardly (in a direction R) of the steering shaft 92 with respect to the vehicle.

In the former and latter electric power steering apparatuses, the rack guide 94 disposed opposite from the pinion 93 with respect to the steering shaft 92 is located closer to an axially middle position (closer to the ball nut 91), so that a support span Y between the ball nut 91 and the rack guide 94 is relatively short. Thus, the rack guide 94 presses the steering shaft 92 against the ball nut 91 pivotally on a mesh point of the steering shaft 92 with the pinion 93, whereby the rattle of the ball screw mechanism is eliminated to reduce the noise.

However, where the steering shaft 92 is warped by a force received from a road surface with the first and second end portions 92a, 92b thereof displaced rearward (in the direction R) as shown in FIG. 5C in the former electric power steering apparatus, the steering shaft 92 is supported at two points by the ball nut 91 and the rack guide 94. Since the support span Y between the ball nut 91 and the rack guide 94 is short, there is a possibility that the support rigidity of the steering shaft 92 is insufficient.

Where the steering shaft 92 is warped by a force received from a road surface with the first and second end portions 92a, 92b thereof displaced rearward (in the direction R) as shown in FIG. 6C in the latter electric power steering apparatus, the second end portion 92b of the steering shaft 92 is not supported until the second end portion 92b is warped rearward (in the direction R) beyond the predetermined warpage. As a result, there is a possibility that the support rigidity of the steering shaft 92 is insufficient.

SUMMARY OF THE INVENTION

It is an object of the present invention to provide a less expensive electric power steering apparatus in which a noise is reduced and the support rigidity of a steering shaft thereof can be maintained at a sufficient level.

In accordance with a preferred embodiment of the present invention, there is provided an electric power steering apparatus, which comprises: a pinion provided on a shaft co-rotatable with a steering member; a steering shaft including a rack meshed with the pinion, the steering shaft being movable axially thereof; a steering shaft guiding device comprising a guide which guides the steering shaft for axial movement, and a biasing member which biases the steering shaft toward the pinion by biasing the guide; and a motion converting mechanism comprising a rotary cylinder surrounding the steering shaft and driven by a steering assist electric motor, the motion converting mechanism being capable of converting rotation of the rotary cylinder into the axial movement of the steering shaft. The steering shaft is supported by the rotary cylinder, the pinion and the guide. The pinion is located between the rotary cylinder and the guide axially of the steering shaft.

According to this embodiment, the steering shaft guiding device is operative to press the steering shaft against the rotary cylinder of the motion converting mechanism pivotally on a mesh point of the pinion and the steering shaft. As a result, rattle occurring between the steering shaft and the rotary cylinder is eliminated, whereby a noise can significantly be reduced.

DETAILED DESCRIPTION OF THE PREFERRED EMBODIMENT

A preferred embodiment of the present invention will hereinafter be described with reference to the attached drawings.

Figure 1:
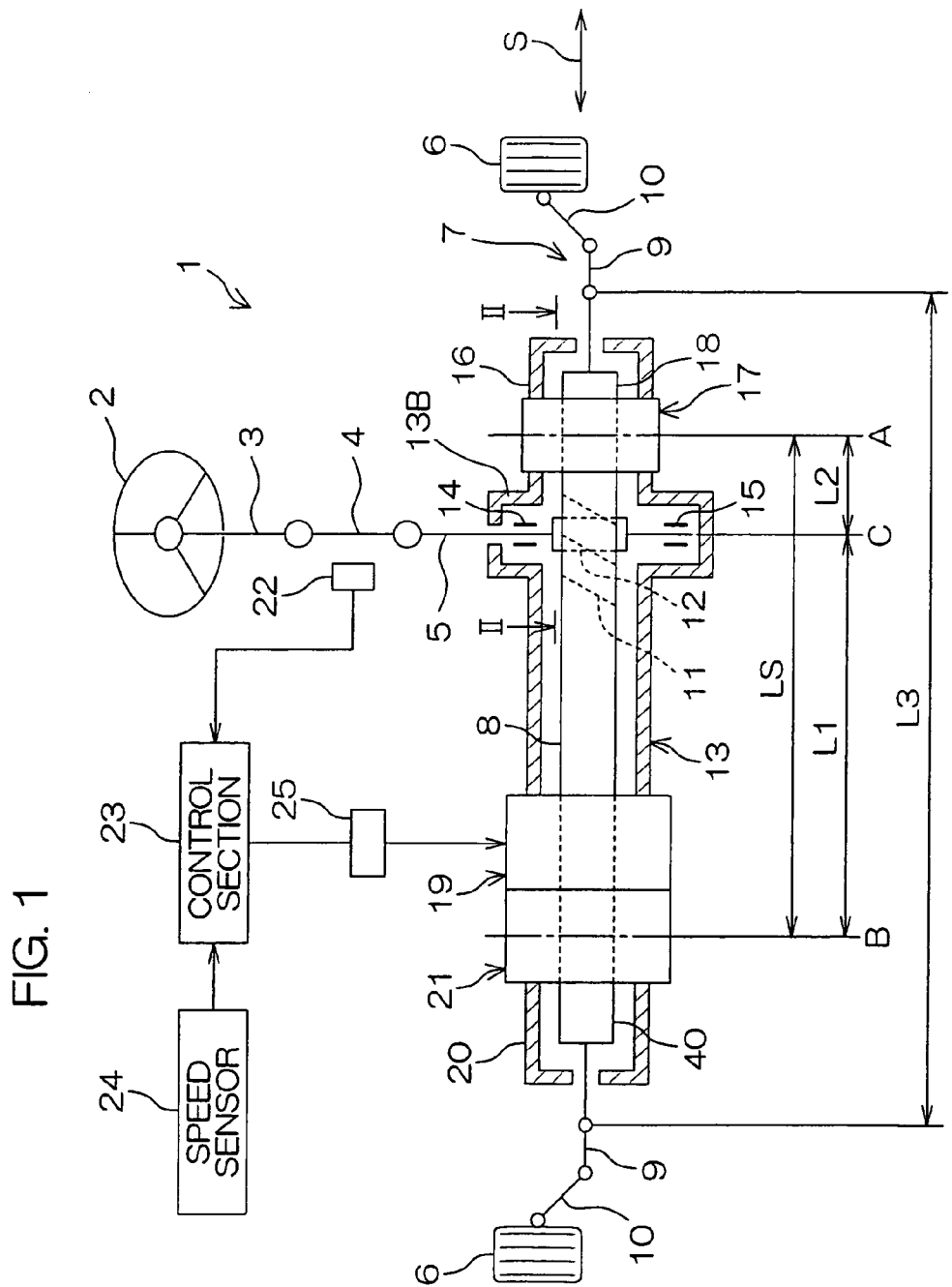
FIG. 1 is a schematic diagram illustrating the schematic construction of an electric power steering apparatus according to one embodiment of the present invention.

FIG. 1 is a schematic diagram illustrating the schematic construction of an electric power steering apparatus according to one embodiment of the present invention. Referring to FIG. 1, the electric power steering apparatus 1 includes a first steering shaft 3 connected to a steering member 2 such as a steering wheel in a co-rotatable manner, a second steering shaft 5 coupled to the first steering shaft 3 in a coaxially co-rotatable manner via a torsion bar 4, and a steering mechanism 7 composed of a rack and pinion mechanism and the like connected to the second steering shaft 5 for turning steerable wheels 6.

The steering mechanism 7 includes a third steering shaft 8 movable in its axial direction S in a non-rotatable manner, and knuckle arms 10 respectively coupled to opposite ends of the third steering shaft 8 via tie rods 9 and respectively supporting the steerable wheels 6. The turning of the wheels 6 is achieved by the movement in the axial direction S of the third steering shaft 8. A rack 11 is provided on an axial portion of the third steering shaft 8 adjacent to one end portion 18 thereof.

The axial direction S of the third steering shaft 8 extends transversely of a motor vehicle. In the following explanation, the third steering shaft 8 is sometimes referred to simply as "steering shaft 8".

A pinion 12 supported at one end of the second steering shaft 5 in a co-rotatable manner is meshed with the rack 11. When the first and second steering shafts 3, 5 are driven to be rotated by the operation of the steering member 2, the rotation is converted into the axial movement of the third steering shaft 8 by the pinion 12 and the rack 11.

The third steering shaft 8 and the pinion 12 are accommodated in a housing 13. Bearings 14, 15, which are disposed on opposite sides of the pinion 12 in the housing 13, are attached to the second steering shaft 5. The second steering shaft 5 is rotatably supported by a second support portion 13B of the housing 13 via these bearings 14, 15.

A steering shaft guiding device 17, which biases the steering shaft 8 toward the pinion 12 (to the rear side of a paper face in FIG. 1) and supports the steering shaft 8 in an axially slidable manner, is provided on one end portion 16 of the housing 13. The steering shaft guiding device 17 supports a portion of the one end portion 18 of the steering shaft 8 closer to the end of the steering shaft 8 (the right end in FIG. 1) than a mesh point of the pinion 12.

The electric power steering apparatus 1 is of a so-called rack assist type, and is adapted to drive a steering assist electric motor 19 to apply a steering assist force to the third steering shaft 8. The output rotation of the electric motor 19 is converted into the axial movement of the steering shaft 8 by a ball screw mechanism 21 as a motion converting mechanism. The ball screw mechanism 21 is arranged at the other end portion 20 of the housing 13 and supports the other end portion 40 of the steering shaft 8 in an axially movable manner.

Figure 4A:
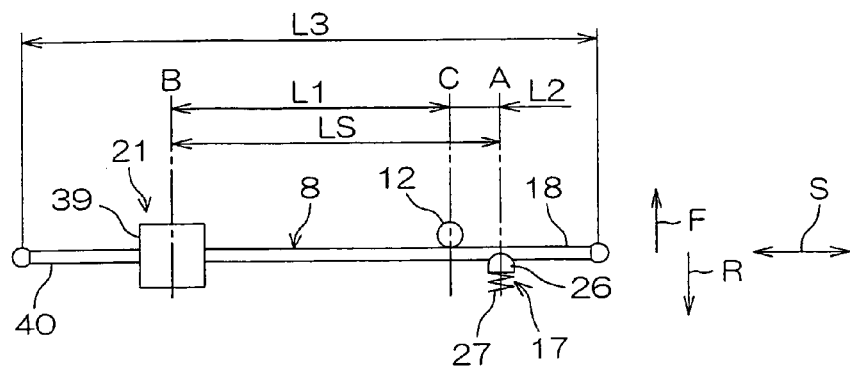
FIG. 4A is a schematic diagram of a support arrangement for a steering shaft.

With the aforesaid arrangement, the pinion 12 is located between the ball screw mechanism 21 and the steering shaft guiding device 17 axially of the steering shaft 8. More specifically, as shown in FIG. 4A, the pinion 12 is located between a rotary cylinder 39 of the ball screw mechanism 21 and a guide 26 of the steering shaft guiding device 17 as will be described later.

On the other hand, a torque sensor 22 for detecting an operation torque of the steering member 2 on the basis of a relative angular offset between the first and second steering shafts 3 and 5 via the torsion bar 4 is provided in the vicinity of the torsion bar 4. A detection signal from the torque sensor 22 is inputted into a control section 23 including a microprocessor and the like. Further, a detection signal from a vehicle speed sensor 24 for detecting a vehicle speed is inputted to the control section 23.

The control section 23 outputs a control signal to a drive circuit 25 as a driving section for driving the electric motor 19 according to the detection signals from the torque sensor 22 and the vehicle speed sensor 24. The drive circuit 25, which receives the control signal, supplies electric power to the electric motor 19 to drive the electric motor 19.

Figure 2:
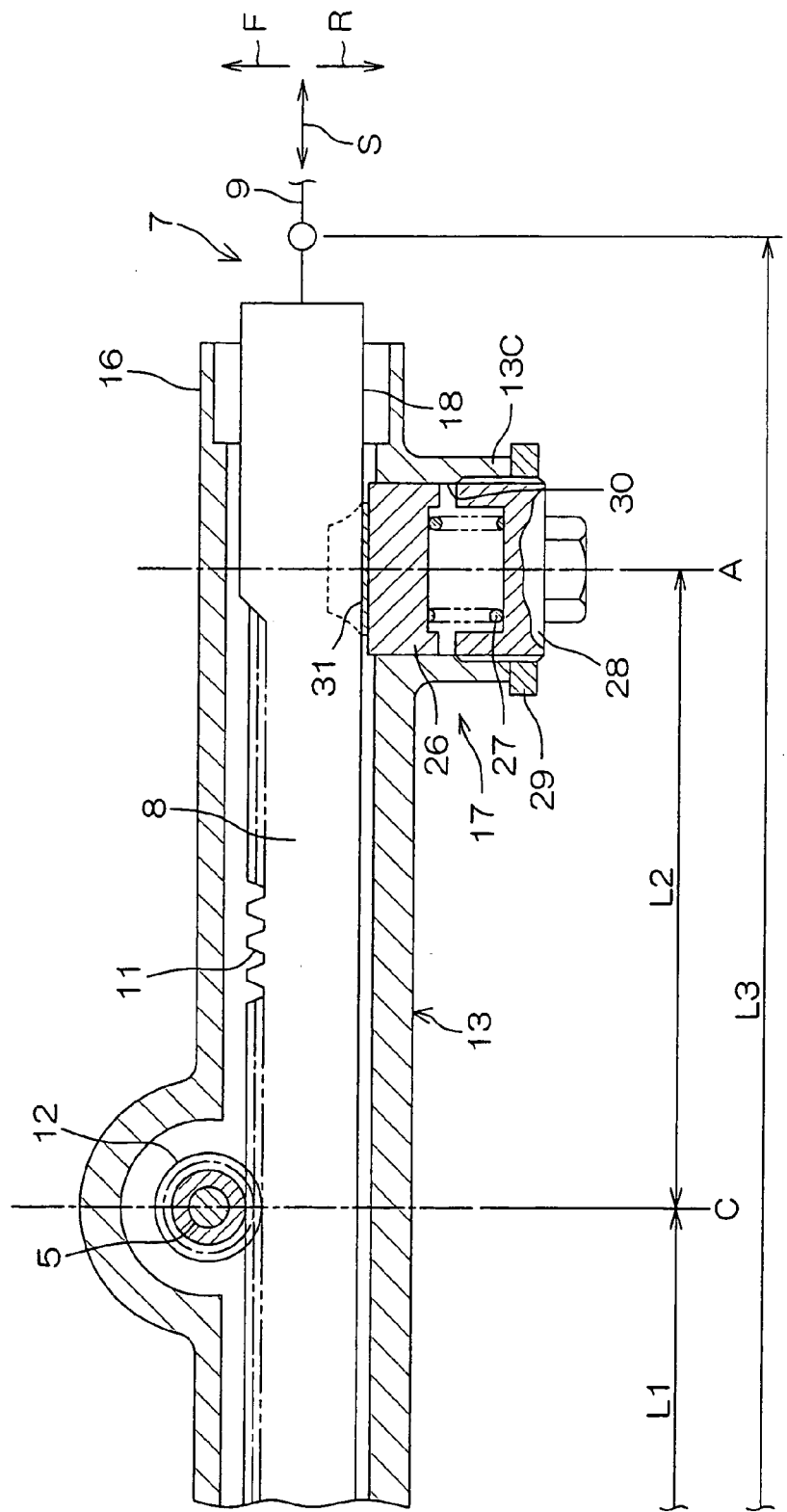
FIG. 2 is a sectional view taken along a line II—II in FIG. 1.

Referring to FIG. 2, the steering shaft guiding device 17 includes a guide 26 which guides the third steering shaft 8 in an axially slidable manner, a biasing member 27 which biases the steering shaft 8 toward the pinion 12 by biasing the guide 26, an adjustment bolt 28 for adjusting a biasing force of the biasing member 27, and a lock nut 29 which fixes the adjustment bolt 28 to the housing 13.

The biasing member 27 includes a resilient member such as a compression coil spring, for example. The housing 13 has a cylindrical third support portion 13C. The guide 26 and the biasing member 27 are accommodated in an accommodation hole 30 of the third support portion 13C.

The guide 26 is supported by the third support portion 13C movably in a direction perpendicular to the axial direction S of the third steering shaft 8, i.e., forwardly and rearwardly with respect to the vehicle (in a direction F and in a direction R) in this embodiment.

The adjustment bolt 28 is screwed into a thread portion provided in the accommodation hole 30 of the third support portion 13C. By adjusting the penetration depth of the adjustment bolt 28 in the accommodation hole 30, the compression of the biasing member 27 is adjusted. As a result, a biasing force to be applied to bias the steering shaft 8 toward the pinion 12 is set at a desired level. The guide 26 has a contact portion 31 opposed to a portion of the circumference of the steering shaft 8, and is kept in contact with the steering shaft 8 via the contact portion 31.

The length of the contact portion 31 in contact with the steering shaft 8 as measured in the axial direction S of the steering shaft 8 is much shorter than the full length L3 of the steering shaft 8 (see FIGS. 1 and 2). Therefore, the guide 26 is regarded as supporting the third steering shaft 8 at a single position, i.e., at an axially middle position A thereof.

Figure 3:
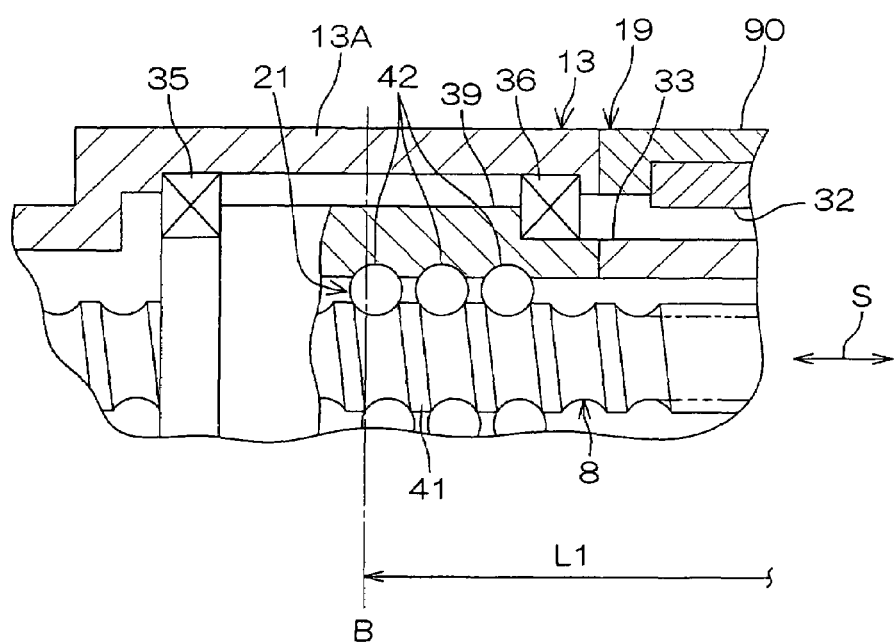
FIG. 3 is an enlarged fragmentary sectional view illustrating an electric motor and a ball screw mechanism.

FIG. 3 is an enlarged fragmentary sectional view illustrating the electric motor 19 and the ball screw mechanism 21. Referring to FIG. 3, the electric motor 19 is, for example, composed of a brushless motor, and includes a motor housing 90 fixed to the housing 13, a stator 32 fixed to the inner periphery of the motor housing 90 and extending axially, and a rotor 33 coaxially surrounded by the stator 32.

The ball screw mechanism 21 includes the rotary cylinder 39 as a ball nut surrounding the steering shaft 8 and supporting the steering shaft 8 in an axially movable manner, a screw shaft 41 provided as a part of the steering shaft 8, and a plurality of balls (rolling members) 42 provided between the rotary cylinder 39 and the screw shaft 41 in engagement with the rotary cylinder 39 and the screw shaft 41.

In the ball screw mechanism 21, the rotary cylinder 39 and the screw shaft 41 are screwed together via the balls 42. The ball screw mechanism 21 has an ordinary structure of a so-called interior or exterior circulation type, in which the balls 42 are circulated through a space defined between a thread groove on the inner periphery of the rotary cylinder 39 and a thread groove on the outer periphery of the screw shaft 41.

One end of the rotary cylinder 39 is coupled to one end of the rotor 33 of the electric motor 19 in a co-rotatable manner. Bearings 35 and 36 are fitted around opposite end portions of the rotary cylinder 39 respectively. The housing 13 has a cylindrical first support portion 13A. The rotary cylinder 39 is rotatably supported by the first support portion 13A of the housing 13 via the bearings 35, 36, while being prohibited from axial movement.

The rotary cylinder 39 circumferentially supports the screw shaft 41 via the balls 42, and the third steering shaft 8 including the screw shaft 41 is axially moved according to the rotation of the rotary cylinder 39.

The full length of the rotary cylinder 39 as measured in the axial direction S of the steering shaft 8 is much shorter than the length L3 of the steering shaft 8 (see FIG. 1). Therefore, the rotary cylinder 39 is regarded as supporting the third steering shaft 8 at a single position, i.e., at an axially middle position B with respect to its ball receiving inside area thereof.

Figure 4B:
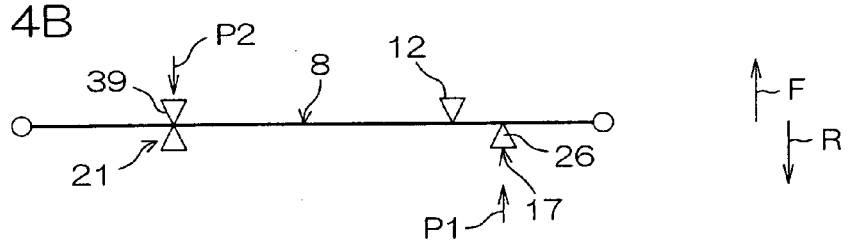
FIG. 4B is a diagram further schematically illustrating the support arrangement of FIG. 4A.

FIG. 4A is a schematic plain view of one embodiment of the support arrangement for the third steering shaft 8. FIG. 4B is a diagram further schematically illustrating the support arrangement of FIG. 4A. Referring to FIGS. 4A and 4B, the steering shaft 8 is supported by the rotary cylinder 39 of the ball screw mechanism 21, the pinion 12, and the guide 26 of the steering shaft guiding device 17. The rotary cylinder 39 circumferentially supports the steering shaft 8, the pinion 12 supports a front portion of the steering shaft 8, and the steering shaft guiding device 17 supports a rear portion of the steering shaft 8.

Referring to FIG. 4B, a force P1 applied by the steering shaft guiding device 17 to press the steering shaft 8 is converted into a force P2 applied to press the steering shaft 8 against the rotary cylinder 39 pivotally on the pinion 12.

Figure 4C:
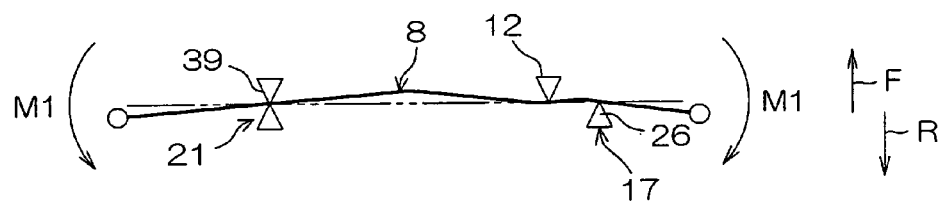
FIGS. 4C and 4D are schematic diagrams illustrating states where an external force is exerted on the steering shaft of FIG. 4B longitudinally of a vehicle body.

When the vehicle travels on a rough road, for example, an external force may be exerted on the ends of the steering shaft 8 from a road surface. For example, moments M1, M1 may act on the steering shaft 8 to warp the steering shaft 8 with the ends of the steering shaft 8 displaced rearward (in the direction R) as shown in FIG. 4C. In this case, the steering shaft 8 is supported at three points by the rotary cylinder 39, the pinion 12 and the guide 26, and warped as indicated by a solid line. In FIG. 4C, the state of the steering shaft 8 before the warp is indicated by a two-dot-and-dash line.

Figure 4D:
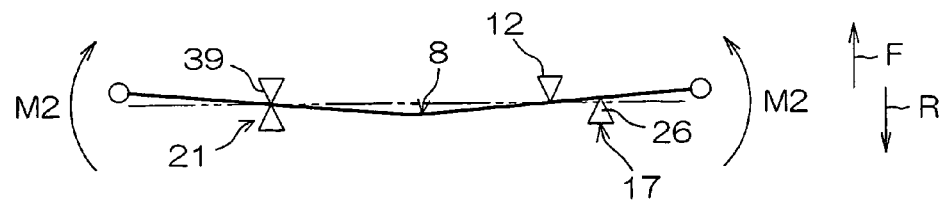
Figure 5A:
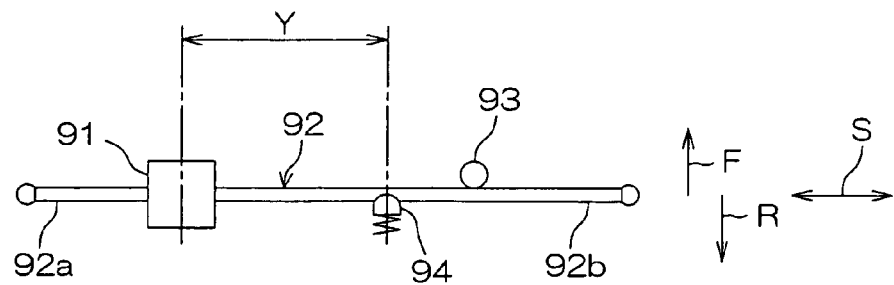
FIG. 5A is a schematic diagram of a support arrangement for a conventional steering shaft.
Figure 5B:
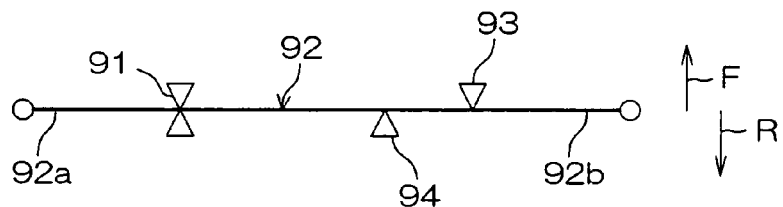
FIG. 5B is a diagram further schematically illustrating the support arrangement of FIG. 5A.
Figure 5C:
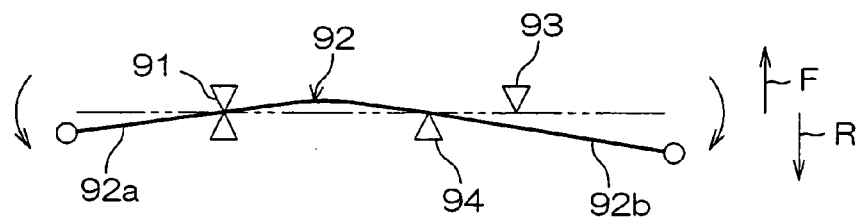
FIG. 5C is a schematic diagram illustrating a state where an external force is exerted on the steering shaft of FIG. 5B longitudinally of a vehicle body.
Figure 6A:
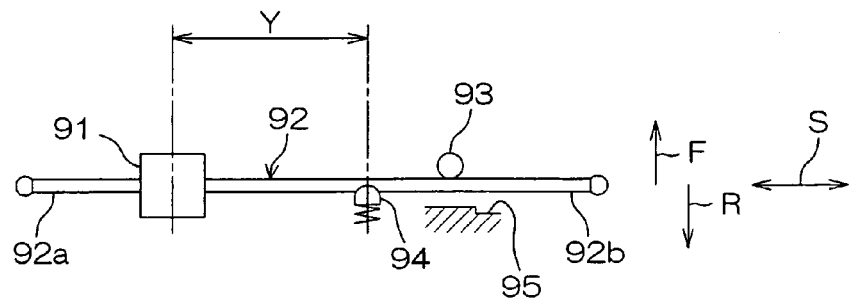
FIG. 6A is a schematic diagram of a support arrangement for another conventional steering shaft.
Figure 6B:
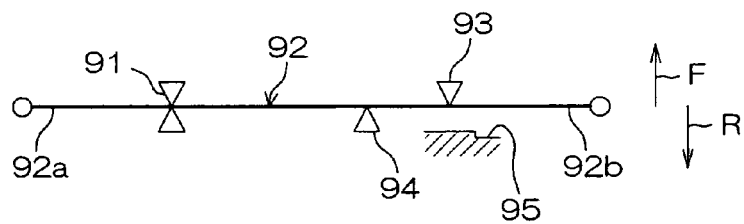
FIG. 6B is a diagram further schematically illustrating the support arrangement of FIG. 6A.
Figure 6C:
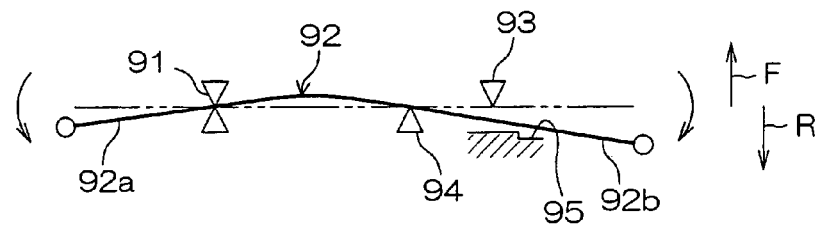
FIG. 6C is a schematic diagram illustrating a state where an external force is exerted on the steering shaft of FIG. 6B longitudinally of a vehicle body.

Further, moments M2, M2 may act on the steering shaft 8 to warp the steering shaft 8 with the ends of the steering shaft 8 displaced forward (in the direction F) as shown in FIG. 4D. In this case, the steering shaft 8 is supported at two points by the rotary cylinder 39 and the pinion 12, and warped as indicated by a solid line. In FIG. 4D, the state of the steering shaft 8 before the warp is indicated by a two-dot-and-dash line.

The rotary cylinder 39, the pinion 12 and the guide 26 are located in positional relation such as to minimize the warpage of the steering shaft 8.

More specifically, where a distance between the axially middle position B of the rotary cylinder 39 of the ball screw mechanism 21 and the axially middle position C of the pinion 12 is L1 and a distance between the axially middle position C of the pinion 12 and the axially middle position A of the guide 26 is L2, the distance ratio L1:L2 is about 20 to 45:1. That is, L1/L2=20 to 45.

According to the embodiment described above, the guide 26 of the steering shaft guiding device 17 presses the steering shaft 8 toward the rotary cylinder 39 of the ball screw mechanism 21 pivotally on the pinion 12. As a result, the rattle occurring between the steering shaft 8 and the rotary cylinder 39 is eliminated, whereby the noise can significantly be reduced.

As shown in FIG. 4A, the guide 26 of the steering shaft guiding device 17 is located more distantly from the rotary cylinder 39 than the pinion 12 in the axial direction S of the steering shaft 8. That is, the distance LS between the guide 26 and the rotary cylinder 39 is greater than the distance L1 between the pinion 12 and the rotary cylinder 39 (LS>L1).

Therefore, a support span between the guide 26 and the rotary cylinder 39 (equivalent to LS: LS=L1+L2) is not shorter than the support span of an ordinary electric power steering apparatus. Even where the moments M2, M2 which cause the steering shaft 8 to warp with the ends of the steering shaft 8 displaced forward (in the direction F) act on the steering shaft 8 as shown in FIG. 4D and, as a result, the steering shaft 8 is supported at two points by the rotary cylinder 39 and the pinion 12, the support span L1 is virtually equivalent to that in the ordinary electric power steering apparatus. Therefore, the support rigidity of the steering shaft 8 can be maintained at substantially the same level as in the ordinary electric power steering apparatus.

On the other hand, where the moments M1, M1 which cause the steering shaft 8 to warp with the ends of the steering shaft 8 displaced rearward (in the direction R) act on the steering shaft 8 as shown in FIG. 4C, the steering shaft 8 is supported at three points by the rotary cylinder 39, the pinion 12 and the guide 26. As a result, the support rigidity of the steering shaft 8 can drastically be enhanced. Therefore, the support rigidity of the steering shaft 8 can be maintained at a sufficient level, even if the ends of the steering shaft 8 are displaced either forward or rearward (in the direction F or R).

Further, the reduction of the noise of the ball screw mechanism 21 can be achieved at lower costs without performing the conventionally required troublesome matching assembly process.

The present invention is not limited to the embodiment described above. For example, although the pinion 12 is disposed forwardly (in the direction F) of the steering shaft 8 and the steering shaft guiding device 17 is disposed rearwardly (in the direction R) of the steering shaft 8 in the embodiment described above, this arrangement is not limitative. The pinion 12 and the steering shaft guiding device 17 maybe disposed rearwardly (in the direction R) and forwardly (in the direction F), respectively, of the steering shaft 8.

Further, the bearing screw mechanism may be employed as the motion converting mechanism instead of the ball screw mechanism 21.

Although the electric motor 19 is provided around the steering shaft 8 and the rotor 33 of the electric motor 19 is disposed coaxially with the steering shaft 8 in the embodiment described above, this arrangement is not limitative. For example, the rotor 33 of the electric motor 19 (corresponding to an output shaft) and the steering shaft 8 may be disposed as extending along different axes, and the output of the electric motor 19 may be transmitted to the ball screw mechanism 21 via transmission means such as a gear or a belt.

While the present invention has thus been described in detail by way of the specific embodiment thereof, those skilled in the art who understand the foregoing disclosure will easily come up with modifications, variations and equivalents of the invention. Therefore, it should be understood that the scope of the invention be defined by the following claims and the equivalents thereof.

This application corresponds to Japanese Patent Application No. 2003-122422 filed with the Japanese Patent Office on Apr. 25, 2003.

What is claimed is:

1. An electric power steering apparatus for a vehicle comprising:
    a pinion provided on a shaft co-rotatable with a steering member;
    a steering shaft including a rack meshed with the pinion, the steering shaft being movable in an axial direction thereof;
    a steering shaft guiding device comprising a guide which guides the steering shaft for movement in the axial direction, and a biasing member which biases the steering shaft toward the pinion by biasing the guide; and
    a motion converting mechanism comprising a rotary cylinder surrounding the steering shaft and driven by a steering assist electric motor, the motion converting mechanism being capable of converting rotation of the rotary cylinder into the axial movement of the steering shaft;
    wherein the steering shaft is supported by the rotary cylinder, the pinion and the guide;
    wherein the pinion is located between the rotary cylinder and the guide axially of the steering shaft;
    wherein a distance between a middle position of the rotary cylinder and a middle position of the pinion as measured in the axial direction of the steering shaft is 20 to 45 times a distance between the middle position of the pinion and a middle position of the guide as measured in the axial direction of the steering shaft, and
    wherein the steering shaft, pinion and rotatable cylinder are configured in relation such that a bending moment applied to warp the steering shaft, in a manner that both ends of the steering shaft are displaced in a single direction either forwardly or rearwardly with respect to the vehicle, will press the steering shaft against the rotatable cylinder pivotally about a point where the pinion meshes with the steering shaft.

2. An electric power steering apparatus as set forth in claim 1, wherein a distance between a middle position of the rotary cylinder and a middle position of the guide as measured in the axial direction of the steering shaft is greater than a distance between the middle position of the rotary cylinder and a middle position of the pinion as measured in the axial direction of the steering shaft.

3. An electric power steering apparatus as set forth in claim 1, further comprising a housing accommodating at least part of the steering shaft, the housing having:
    a first support portion which rotatably supports the rotary cylinder via a bearing;
    a second support portion which rotatably supports the shaft provided with the pinion via a bearing; and
    a third support portion which supports the guide movably in a direction perpendicular to the axial direction of the steering shaft.

4. An electric power steering apparatus as set forth in claim 1, wherein the motion converting mechanism comprises a ball screw mechanism comprising a ball nut as the rotary cylinder, a screw shaft provided as a part of the steering shaft and balls engaged with the ball nut and the screw shaft.

5. An electric power steering apparatus as set forth in claim 1, wherein one of the pinion and the guide of the steering shaft guiding device is located forwardly of the steering shaft with respect to the vehicle, and the other is located rearwardly of the steering shaft.

* * * * *